United States Patent
Pisters et al.

(10) Patent No.: US 9,195,391 B2
(45) Date of Patent: Nov. 24, 2015

(54) TOUCH SENSITIVE DATA ENTRY USING A CONTINUOUS GESTURE

(71) Applicant: International Business Machines Corporation, Armonk, NY (US)

(72) Inventors: Ramon L. H. Pisters, Weert (NL); Franciscus J. J. van Ham, Geldrop (NL)

(73) Assignee: International Business Machines Corporation, Armonk, NY (US)

(*) Notice: Subject to any disclaimer, the term of this patent is extended or adjusted under 35 U.S.C. 154(b) by 123 days.

(21) Appl. No.: 13/866,490

(22) Filed: Apr. 19, 2013

(65) Prior Publication Data

US 2014/0313135 A1   Oct. 23, 2014

(51) Int. Cl.
G06F 3/041 (2006.01)
G06F 3/0488 (2013.01)
G06F 3/0484 (2013.01)

(52) U.S. Cl.
CPC .......... *G06F 3/04883* (2013.01); *G06F 3/0484* (2013.01)

(58) Field of Classification Search
CPC ............. G06F 3/04883; G06F 2203/04808; G06F 3/04886; G06F 3/0488; G06F 3/017; G06F 3/04845; G06F 2203/04806
USPC ........................................................ 345/173
See application file for complete search history.

(56) References Cited

U.S. PATENT DOCUMENTS

| | | | |
|---|---|---|---|
| 7,469,381 B2 | 12/2008 | Ording | |
| 8,188,980 B2 | 5/2012 | Kwon et al. | |
| 8,223,127 B2 | 7/2012 | Park et al. | |
| 8,239,784 B2 | 8/2012 | Hotelling et al. | |
| 2003/0076301 A1 | 4/2003 | Tsuk et al. | |
| 2006/0005146 A1* | 1/2006 | Arcas | 715/802 |
| 2009/0037840 A1* | 2/2009 | Chen | 715/784 |
| 2012/0081294 A1* | 4/2012 | Dinh et al. | 345/169 |
| 2012/0092267 A1* | 4/2012 | Haug | 345/173 |
| 2012/0176329 A1 | 7/2012 | Rhee | |
| 2012/0226977 A1 | 9/2012 | Lengeling et al. | |

FOREIGN PATENT DOCUMENTS

| | | |
|---|---|---|
| CN | 102566896 A | 7/2012 |
| EP | 2328067 A1 | 1/2011 |

OTHER PUBLICATIONS

IBM, "Text input on a smart watch with a roller wheel and touch screen", IP.com Prior Art Database, IPCOM000029075D, Jun. 15, 2004.

Moscovich, et al., "Navigating Documents with the Virtual Scroll Ring", UIST '04, Oct. 24-27, 2004, Santa Fe, New Mexico, USA, Copyright © 2004.

(Continued)

*Primary Examiner* — Charles V Hicks
*Assistant Examiner* — Charles Zheng
(74) *Attorney, Agent, or Firm* — Stephen R. Yoder (57) ABSTRACT

An adjustment control user interface usable through a user interface such as a touchscreen. The adjustment control includes elongated gesture zones stacked in a stacking direction so that: (i) gesture movement in the elongation direction will adjust the value of an adjustment variable; and (ii) gesture movement in the stacking direction from one stacked gesture zone to another will change the identity of the current adjustment variable and/or the adjustment granularity of the current adjustment variable.

15 Claims, 5 Drawing Sheets

(56) References Cited

OTHER PUBLICATIONS

Ramos, et al., "Zliding: Fluid Zooming and Sliding for High Precision Parameter Manipulation", UIST '05, Oct. 23-27, 2005, Seattle, Washington, USA, Copyright 2005, pp. 143-152.
"Detecting a rotation gesture event", <https://developerblackberry.com/air/documentation/bb10/detecting_a_rotation_gesture_event.html>, Copyright © 2013 BlackBerry, unless otherwise noted.
"Dysternis>>An one finger rotation gesture recognizer", Feb. 13, 2012, <http://blog.mellenthin.de/archives/2012/02/13/an-one-finger-rotation-gesture-recognizer/>.
"Gestures, manipulations, and interactions (Windows Store apps) (Windows)", <http://msdn.microsoft.com/en-in/library/windows/apps/hh761498.aspx>, Build date Nov. 29, 2012.

* cited by examiner

TOUCH SENSITIVE DATA ENTRY USING A CONTINUOUS GESTURE

FIELD OF THE INVENTION

The present invention relates generally to the field of data entry mechanisms, and more particularly to the entry of data through a touch gesture made on a touch screen device.

BACKGROUND OF THE INVENTION

A touch screen is an electronic visual display that the user can control through simple or multi-touch gestures by touching the screen with one or more fingers. The user uses the touch screen to react to what is displayed and/or to control how it is displayed. Known single touch gestures include: (i) rotating knobs; (ii) swiping the screen to activate a switch; and (iii) touch screen keyboards. Known multi-touch gestures include: (i) selecting a range of a line; (ii) connecting objects; and (iii) a "tap-click" gesture to make a selection while maintaining location with another finger.

Touch sensitive technologies have revolutionized how users (currently usually human users, see Definitions subsection of the DETAILED DESCRIPTION section, below) interact with information on touch screen devices. This has led to the design of many input gestures which are more natural for interaction with images or web content than manipulation using a traditional indirect pointing device such as a mouse. Examples include: (i) swiping; (ii) direct manipulation of graphical objects; and (iii) press and pinch-zoom. Other solutions to the general problem interacting with information on touch screen devices include methods that facilitate textual input by sliding a finger over a virtual representation of a keyboard.

Published US patent application 2012/0092267 ("Haug") states as follows: "A processor-implemented data input module may adjust an input data value for the data input field at a granularity based on the user input contact point and at a rate based on an angular velocity of movement within the concentric circular user interface (UI). The circular UI is designed to be ergonomically efficient such that the need for multiple finger or hand movements and clicks or taps is minimized. For example, if the user initially touches an inner circle of the UI to adjust input data values coarsely (i.e. with a larger granularity), the user need only to slide his finger over to the outer circle when finer control over input data value selection is desired."

SUMMARY

Embodiments of the present invention disclose a method, computer program, and system of communicating information through a touchscreen user interface device having a display. The process of communication includes: (i) defining a plurality of gesture zones on the display; and (ii) receiving gesture input, through the display. The plurality of gesture zones includes a first gesture zone, a second gesture zone and a third gesture zone. Each gesture zone of the plurality of gesture zones is shaped to define an elongation direction for that gesture zone. The gesture zones of the plurality of gesture zones are stacked in a stacking direction. The stacking direction is at least generally normal to the elongation directions of the gesture zones of the plurality of gesture zones. The gesture input includes: (i) a first gesture segment within the first gesture zone, (ii) a second gesture segment within the second gesture zone, and (iii) a third gesture segment within the third gesture zone. At least the defining step is performed by computer software running on computer hardware.

DETAILED DESCRIPTION

The DETAILED DESCRIPTION section will be divided into the following sub-sections: (i) The Hardware and Software Environment; (ii) Operation of Embodiment(s) of the Present Invention; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
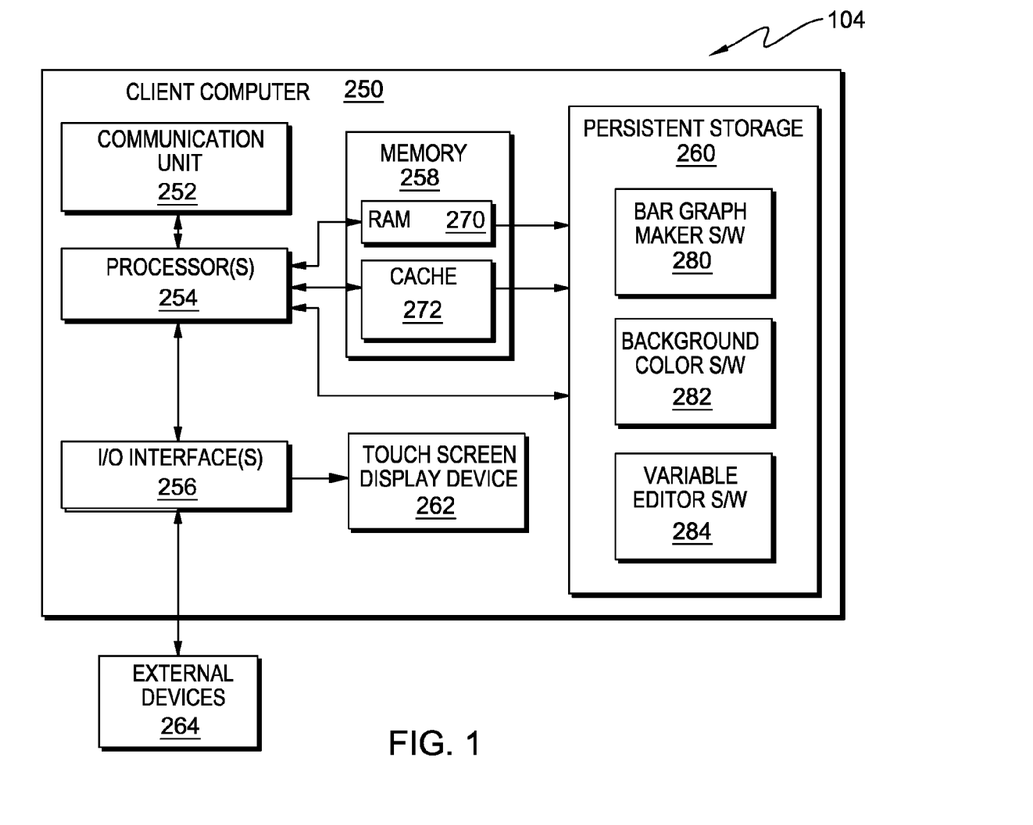
FIG. 1 is a schematic view of a first embodiment computer system according to the present invention.

The hardware and software environment for an embodiment of the present invention will now be described in detail with reference to the Figures. FIG. 1 is a functional block diagram of client computer system 104, including: client computer 250; communication unit 252; computer processor 254; memory component 258; RAM component 270; cache 272; persistent storage component 260; bar graph maker program 280; background color program 282; variable editor software 284; I/O (input/output) interface(s) 256; touch screen display device 262; external device(s) 264.

Variable editor software 284 and its various constituent modules implement touch screen data entry according to an embodiment of the present invention. This will be discussed in detail in the next sub-section of this DETAILED DESCRIPTION section. For the rest of this sub-section, the hardware and software environment, in which variable editor software 284 operates, will be discussed in detail.

In many respects, client computer system 104 is representative of the various computer systems of the present invention. Various components of client computer system 250 will be discussed in the following paragraphs.

Client computer 250 may be a laptop computer, tablet computer, netbook computer, personal computer (PC), a desktop computer, a personal digital assistant (PDA), a smart phone, or any programmable electronic device. As shown in FIG. 1, variable editor software 284 is a collection of machine readable instructions and data that is used to manage and control the client computer system.

It should be appreciated that FIG. 1 provides only an illustration of one implementation (that is, system 104) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

Client computer system 104 is shown as a block diagram with many double arrows. These double arrows (no separate reference numerals) represent a communications fabric, which provides communications between various components of system 104 as shown in FIG. 1. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 258 and persistent storage 260 are computer-readable storage media. In general, memory 258 can include any suitable volatile or non-volatile computer-readable storage media. It is further noted that, now and/or in the near future: (i) external device(s) 264 may be able to supply, some or all, memory for system 104; and/or (ii) devices external to system 104 may be able to provide memory for system 104.

Bar graph maker 280, background color software 282, and variable editor software 284 are stored in persistent storage 260 for access and/or execution by one or more of the respective computer processor(s) 254, usually through one or more memories of memory 258. Persistent storage 260 is at least more persistent than a signal in transit is, but the persistent storage may, of course, be substantially less persistent than permanent storage. Software 284 may include both machine readable and performable instructions and/or substantive data (that is, the type of data stored in a database). In this particular embodiment, persistent storage 260 includes a magnetic hard disk drive. To name some possible variations, persistent storage 260 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 260 may also be removable. For example, a removable hard drive may be used for persistent storage 260. Other examples include optical and magnetic disks, thumb drives, and smart cards that are inserted into a drive for transfer onto another computer-readable storage medium that is also part of persistent storage 260.

Communications unit 252, in these examples, provides for communications with other data processing systems or devices external to system 104, such as cloud storage (not shown). In these examples, communications unit 252 includes one or more network interface cards. Communications unit 252 may provide communications through the use of either or both physical and wireless communications links. Any software modules discussed herein may be downloaded to a persistent storage device (such as persistent storage device 260) through a communications unit (such as communications unit 252).

I/O interface(s) 256 allows for input and output of data with other devices that may be connected locally in data communication with client computer 250. For example, I/O interface 256 provides a connection to external device set 264. While a client computer system may include user input devices built into the main body of the computer, other types of computer sub-systems may have an external device set that typically includes devices such as a keyboard, keypad, a touch screen, and/or some other suitable input device. External device set 264 can also include portable computer-readable storage media such as, for example, thumb drives, portable optical or magnetic disks, and memory cards. Software and data used to practice embodiments of the present invention, for example, variable editor software 284, can be stored on such portable computer-readable storage media. In these embodiments the relevant software may (or may not) be loaded, in whole or in part, onto persistent storage device 260 via I/O interface(s) 256. I/O interface(s) 256 also connects in data communication with touch screen display device 262.

Display device 262 provides a mechanism to display data to a user and may be, for example, a computer monitor or a smart phone display screen. Display device 262 provides a mechanism to display data to a user and takes the form of a touch screen display. Alternatively, the software of the present invention may be (in whole or in part) present in, and executed by, a laptop or desktop computer which has a traditional non-touch-screen display, such as a traditional computer monitor. In that type of embodiment, user input devices (for example, push buttons, keyboard, mouse) may be provided independently of the display.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation of Embodiment(s) of the Present Invention

Preliminary Note: The flowchart and block diagrams in the foregoing Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
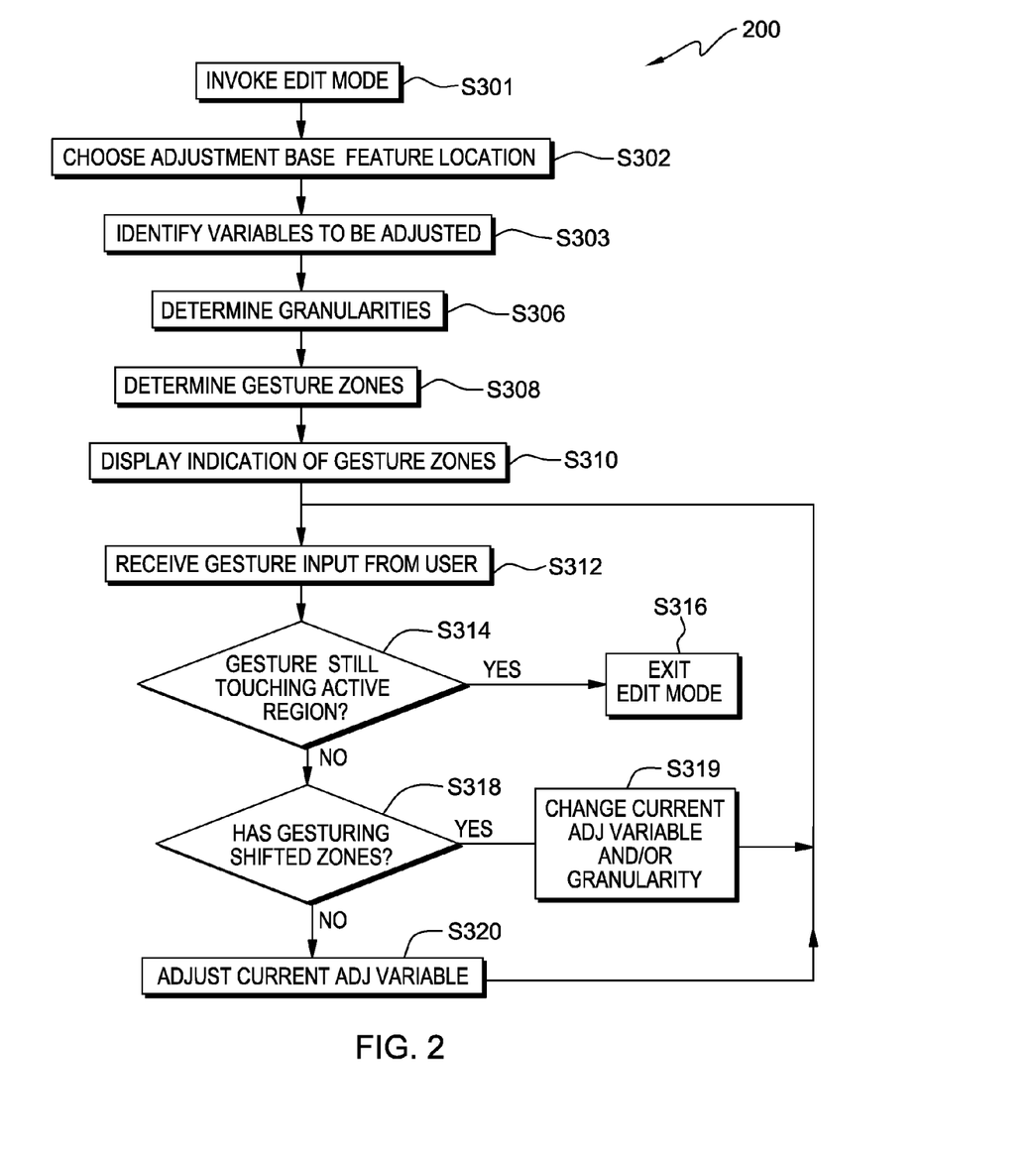
FIG. 2 is a flowchart showing a process according to an embodiment of the present invention.

FIG. 2 is a flowchart depicting process 200 according to an embodiment of the present invention. The various steps of process 200 will now be discussed in turn.

Process 200 begins at step S301, where variable editor software 284 (see FIG. 1) is invoked within an application in use, specifically bar graph maker software 280 (see FIG. 1). Software 284 may be invoked by the user or automatically in response to the existence of a precondition. The process to invoke software 284 in a given application depends on the specific programming of that application. For example, in a bar graph labeled with a value for each bar, the value for that particular bar may be edited by clicking onto the value. In some applications, an editable text box appears. In some embodiments, the user activates variable editor software 284 after the application's edit mode is invoked or the variable editor software automatically activates in response to edit mode being invoked. In an alternative embodiment, variable editor software 284 has a persistent user interface (UI) that is displayed even when software 284 is idle and waiting for a user to invoke it.

Figure 4A:
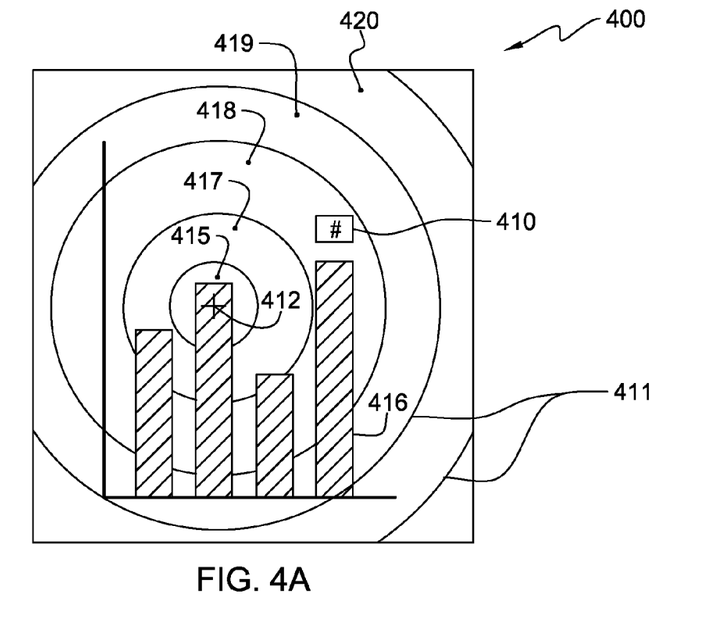
FIG. 4A is a first screenshot generated by the computer system according to the first embodiment computer system.

FIG. 4A shows display 400 on device 262 (see FIG. 1) as it appears after step S310, but this Figure is being introduced now because it shows some of the concepts helpful in understanding steps S301 through S308. Display 400 includes bar height scalar indicator 410; zone demarcation lines 411; adjustment point (or base adjustment feature) 412; inactive region 415; current bar 416; fourth gesture zone 417; third gesture zone 418; second gesture zone 419; and first gesture zone 420.

Figure 4B:
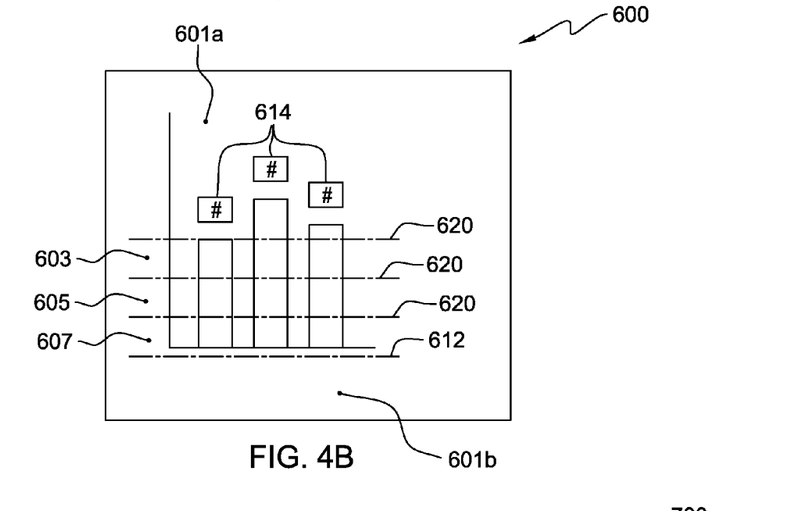
FIG. 4B is a second screenshot generated by the computer system according to the first embodiment computer system.

FIG. 4B shows display 600 on device 262 (see FIG. 1) as it appears after step S310, but this Figure is being introduced now because it shows some of the concepts helpful in understanding steps S301 through S308. Display 600 includes: inactive regions 601*a*, 601*b*; first gesture zone 603; second gesture zone 605; third gesture zone 607; adjustment baseline (or base adjustment feature) 612; bar height scalar indicators 614; and demarcation lines 620.

Process 200 proceeds to step S302, where adjustment base feature module 352 (see FIG. 3) places the adjustment base feature on the touch screen display. See the Definitions subsection of this DETAILED DESCRIPTION section for a definition of the adjustment base feature. The adjustment base feature is shown in FIG. 4A as adjustment point 412. An alternative adjustment base feature is shown in FIG. 4B as adjustment baseline 612. The adjustment base feature must be located on the display screen, but it is not required that the adjustment base feature be visibly displayed. For example, if a user taps the touch screen display to locate the adjustment base feature, it is not required that the user actually see the base feature, although it may be helpful to the user to see the base adjustment feature.

In the embodiment corresponding to display 400 of FIG. 4A, the placement of the adjustment base feature is selected by the user. In the embodiment corresponding to display 600 of FIG. 4B, the adjustment base feature location is selected by adjustment base feature module 352 (see FIG. 3) to be at a default location corresponding to the horizontal axis of the displayed graph. In still other embodiments, the adjustment base feature is dynamically computed based on a rotational gesture of the user. The adjustment base feature module governs the geometry and placement. In still other embodiments of the present invention, there is a default placement of the adjustment base feature at the center of the touch screen in order to provide maximum space for the gesture zones of the active region. In other embodiments, the default placement of the adjustment base feature is application specific.

Process 200 proceeds to step S303, where variable module 354 (see FIG. 3) determines the identity of the variables that are to be adjusted by the adjustment control of the present invention. Each variable that is to be adjusted by the control of the present invention will have a variable type. Variable types include the following: (i) continuous numeric (or continuous; scalar); (ii) stepped numeric (or stepped scalar); (iii) alphanumeric; and (iv) non-ordered. A simple example of a continuous numeric variable would be the width of a window (down to, for example, the nearest sixteenth of an inch). A simple example of a stepped numeric variable would be a user's (integer-only) rating of a movie on a scale of 1-10. A simple example of an alphanumeric variable would be an alphanumeric password.

A simple example of a non-ordered variable would be a set of wallpaper patterns suitable for dining room wallpaper. Non-ordered adjustment type is the type of variable whose value is adjusted in an arbitrary order, because there is no predefined order given the subject matter of the variable. The designated order of a non-ordered variable may be designated by: (i) random selection; (ii) ontological grouping; or (iii) user preference. For example if the non-ordered variable is "favorite fruit," then these could be arbitrarily ordered in alphabetic order.

A single adjustment control according to the present invention may relate to: (i) a simple variable (for example, a single continuous numeric variable); (ii) a "vector" made of multiple interrelated variables; (iii) multiple independent variables; or (iv) a combination of the foregoing. As a simple example of a single variable, an adjustment display used to control the height of a single bar on a bar graph would be directed to a single variable. As a simple example of a vector, the longitude, latitude, and heading of a ship on the ocean would be a vector made up of three interrelated numeric type variables. A simple example of multiple independent variables would be the tax assessment determined value of each house of a set of houses, specifically one numeric variable for each house's respective assessed value.

At step S303, for each variable to be adjusted, an initial value for the variable will also be set. For example, if the only variable to be adjusted is the height of a bar on a bar graph, then the initial value might be the current height of the bar. As a further example, if the variable is the height of a new bar being added to a bar graph, the initial value might be zero (0). As discussed below, variable mod 354 will track the current value(s) of the variable(s) as the user adjusts these values according to the present invention.

In display 400 of FIG. 4A, only a single continuous numeric type variable is being adjusted, specifically the height of bar 416. Similarly, in display 600 of FIG. 4B, three continuous numeric type variables are being adjusted, specifically, the respective heights of the three bars of the bar graph.

Process 200 proceeds to step S306, where granularity mod 355 determines the number of granularity levels at which each variable identified at step S303. For alphanumeric or a stepped numeric variable there will generally be only one level of granularity of adjustment per variable. In display 400 of FIG. 4A, there are four granularity levels at which a single continuous numeric type variable (specifically, the height of bar 416) can be adjusted. In display 600 of FIG. 4B, each of the three variables (that is, the respective heights of the three bars) can only each be adjusted at a single level of granularity.

For continuous numeric variables, there will often be more than one level of granularity which is used to adjust a single continuous scalar value. For one example, a single continuous numeric variable may be defined to have three granularity levels: (i) a first granularity level to adjust the tens place of the value; (ii) a second granularity level to adjust the ones place of the scalar value; and (iii) a third granularity level to adjust the tenths, hundredths and thousandths place of the scalar value. (Note: even though the scalar value in this example can only be adjusted down to the thousandths place, it is still considered a "continuous" numeric variable for purposes of this document because "continuous numeric variables" are any numeric variables susceptible to being adjusted at more than one level of granularity, even if there is a limit on how finely the variable can be adjusted—continuousness in the pure mathematical sense is not required for a continuous numeric variable as that term is used herein.)

The concept of multiple granularity levels may be applicable to some variables of the non-ordered type. For example, if the variable is "favorite fruit": (i) a rough granularity level would be apples versus pears versus oranges versus etc.; and (ii) a fine granularity level would be various types of apples or various types of pears, etc.

Editing a continuous numeric variable can be performed at multiple granularity levels by having each granularity level correspond to an order of magnitude of the scalar under adjustment. When editing a numeric value by gestures, it is helpful to provide for both coarse and fine adjustments of a numeric type variable. It is even more helpful to provide several degrees of adjustment, or several adjustment granularities. In that way, the user is able to minimize gesture movement during the editing process. In this way, the determination of granularity levels, made at S306, has potentially important consequences with respect to user friendliness of the adjustment control user interface of the present invention.

In the embodiment under discussion, granularity mod 355 determines the number of granularity levels for each variable automatically and based entirely on algorithms in its software. Alternatively, the number of granularity levels may be specified by the user.

Process 200 proceeds to step S308, where gesture zone mod 356 determines the size, shape and display placement for the gesture zones. There will be one gesture zone for each granularity level of each variable identified at S303. Gesture zones may be shaped as follows: (i) annular; (ii) arcuate; (iii) elliptical; (iv) linear; and/or (v) other shapes (for example, sine curve). While gesture zones may have many geometries, there are a couple of constraints: (i) they are generally elongated along a variable adjustment direction; and (ii) they are stacked in a direction generally orthogonal to the variable adjustment direction. In some embodiments, the gesture zones must be wide enough (in the direction transverse to the elongated variable adjustment direction) so that a user can reliably place a fingertip, or a pointing device reliably within any given gesture zone, but this is not necessarily required in all embodiments of the present invention. In some embodiments, a set of gesture zones includes a partial gesture zone. For example, a set of concentric circular gesture zones may extend beyond the display such that one or more of the gesture zones are displayed as only arc portions, or partial gesture zones. Some specific examples of gesture zones and the mechanics of using a set of gesture zones by a user will be discussed below.

As one example of a set of gesture zones, assume that adjustment control is being set up to control: (i) one continuous numeric variable with three levels of granularity; and (ii) a single character alphanumeric variable. This means that four stacked gesture zones will be required as follows: (i) three stacked (preferably consecutive) gesture zones for the three levels of granularity of the numeric variable; stacked with (ii) a single gesture zone of the single character alphanumeric variable. In this case the stack of four gesture zones might be, for example, four stacked and concentric annular shapes. As another example of gesture zones, assume a password that is made up of four letters, one digit and one color. This example would require six stacked gesture zones, one for each letter, digit and color.

In some embodiments, the distance and/or orientation between the gesture zones and the adjustment base feature, chosen at step S302, will be important. For example, if the adjustment base feature is a centerpoint to be shared by concentric annular ring shaped gesture zones, then centerpoint will determine where the annular rings are located on the display. As a further example, if multiple gesture zones respectively relate to granularity levels of a single continuous numeric type variable, then it may make it easier for the user to place the coarser granularities further from the centerpoint, so that as the user reaches the centerpoint, the final adjustments are made.

The selection of the shape and/or location of the gesture zones may be determined: (i) automatically by algorithms of gesture zone mod 356; (ii) by user input; or (iii) a combination of the foregoing techniques.

One embodiment of the present invention includes at least three steps (that is, three different gesture zones) so that a user quickly, but precisely, adjusts the numeric variable over a possible range of many orders of magnitude. It is generally desirable for the finer granularities to be closer to the base feature than the coarser granularities. In this way, the user may intuitively advance to the desired order of magnitude and then move toward the adjustment base feature, as the "target" gets closer to the exact number.

In some embodiments there are pragmatic limits to the number of zones that may be assigned on a given display. Limits include: (i) finger size; (ii) screen size; and/or (iii) screen resolution. However, it should be noted that some embodiments may have hundreds, or even thousands of distinct gestures zones, especially if the multitude of zones respectively correspond to different adjustment granularity levels for a single scalar variable.

Process 200 proceeds to step S310, where gesture zone module 356 displays an indication of the gesture zone(s) on display device 262 (see FIG. 1). Similar to the display of the adjustment base feature, the display of the gesture zones is optional. The gesture zone may be displayed in many ways, including the following: (i) a line placed in the center of the zone; (ii) a line at one or more of the boundaries of the zone; (iii) a single dot placed in the center of the zone; and/or (iv) a colored region. In display 400 of FIG. 4A, there are four annular (or ring) shaped gesture zones displayed 417, 418, 419, and 420, and these four stacked, concentric zones are demarcated and delineated by lines 411. Gesture zones 419 and 420 are examples of partial gesture zones that extend beyond the interactive display. In display 600 of FIG. 4B, there are three generally linear (that is, elongated rectangular) gesture zones 603, 605, 607 and these three stacked zones are delineated and demarcated by lines 612 and adjustment base feature 620.

In some embodiments, only a selected number of gesture zones are displayed. For example, in one embodiment, one gesture zone is displayed for each variable; however, when a single continuous scalar value has multiple zones, corresponding to multiple granularities for adjusting the scalar, then these zones are not differentiated from each other in the display.

Process 200 proceeds to step S312, where receive gesture input module 358 receives gesture input from the user through device 262 (see FIG. 1). In the embodiment of FIG. 4A, this gesture input will usually take the form of a series of arcuate shaped gestures made at decreasing (or, perhaps increasing) distances from the centerpoint 412 adjustment base feature. In the embodiment of FIG. 4B, this gesture input will usually take the form of a series of horizontal, linear shaped gestures made at decreasing (or, perhaps increasing) distances from the baseline 612 adjustment base feature.

As will be described in detail below, an iterative process of adjusting the current value(s) of an adjustment variable(s) begins with receipt of gesture input from the user and ends when the user removes her gesture input device, such as a stylus or finger. For non-touch screen displays, the action of pressing the mouse button may start an adjustment process that ends when the mouse button is released.

Gesture input is entered by touching the screen with a gesture input device within the active region. The active region is an input region associated with the variable editor program. Examples of designated active regions include: (i) the entire touch screen input surface; (ii) a region covering a particular distance from the adjustment base feature; and/or (iii) a shape, such as a circle, limited in size by the distance from the adjustment base feature to the nearest edge of the touch screen.

Receive gesture input module 358 identifies coordinate information regarding the first gesture input location when sensing contact within the active region. The coordinate information for the first gesture input location includes: (i) the distance from the adjustment base feature location to the first gesture input location; and/or (ii) the angular location from a baseline angle. The coordinate information of the first gesture input location is stored for comparison to the coordinate information of the next gesture input location. The next gesture input location includes: (i) distance from the next gesture location to the adjustment base feature location; and/or (ii) the angular location from the first gesture location with respect to the adjustment base feature location.

To give a general description of gesturing according to this embodiment of the present invention: (i) the component of gesture motion in the direction of elongation of the stacked gesture zone will serve to adjust the value of a variable; and (ii) the component of gesture motion transverse to the direction of elongation of the gesture zone (that is, the stacking direction of the stacked gesture zones) may serve to take the gesturing: (a) to an end, or (b) into another consecutive gesture zone in the stack (for adjustment of another variable or adjustment of the same variable at a different level of granularity). These possibilities will now be discussed in the following paragraphs.

Process 200 proceeds to step S314, where active gesturing module 360 determines whether the gesture input device is still touching the active region. If the gesture input device is no longer touching the active region, process 200 proceeds to step S316, where variable editor software 284 terminates the editing session. If the gesture input device is still touching the active region, the process advances to step S318.

When process 200 proceeds to step S316, update mod 366 exits the editing mode so that the user is no longer editing any variables. In embodiments where features like the adjustment base feature and/or gesture zone perimeters are displayed to aid the user in adjusting variables, then these features will generally be removed from the display. If the variable adjust impacts the appearance of a feature in the display (for example, the height of a bar in a bar graph or a background color) then the appearance of that feature will be changed in accordance with the just-concluded editing session.

Some of the various ways that various embodiments may determine that an editing session has ended will now be discussed. At a general level, there are two types of schemes for allowing a user to indicate the end of an editing session as follows: (i) one touch schemes where the entire editing session (including its termination) is accomplished by a single continuous gesture and without the user being required to lift her finger from the touchscreen; and (ii) multiple touch. Within the one touch type, there are at least two, more specific, sub-types of schemes as follows: (i) active area departure schemes where a session is ended simply by the gesture leaving the active region (or leaving the active region for at least some threshold amount of time, such as one (1) second); and (ii) termination zone schemes where the one touch gesture must proceed into a predetermined termination zone on the touch screen.

As a simple example of a scheme of the one touch type and active area departure sub-type, the entire touchscreen may be designated as an active region made up of gesture zones and neutral zone(s), so that the user must take her finger off the touchscreen in order to terminate the editing session. As another simple example of a scheme of the one touch type and active area departure sub-type, software may be programmed to exit the editing session when the gesture leaves any and all gesture zones, regardless of whether she removes her fingertip from the touchscreen.

As a simple example of a scheme of the one touch type and termination zone sub-type, the area immediately around a centerpoint (see centerpoint 412 of FIG. 4A) may be designated as a termination zone, so that the user must take her finger to this centerpoint (or take her finger to this centerpoint and leave it there for some predetermined time threshold) in order to terminate the editing session. In this example, if the user's fingertip leaves the touchscreen then this act will not terminate the editing session because the session is only ended by going to the termination zone. Accordingly, the variable(s) may be adjusted by multiple gestures. However, this remains a one touch type termination scheme because the user is not required to use multiple gestures, and may (and probably often will) adjust the variable(s) with a single gesture.

Figure 3:
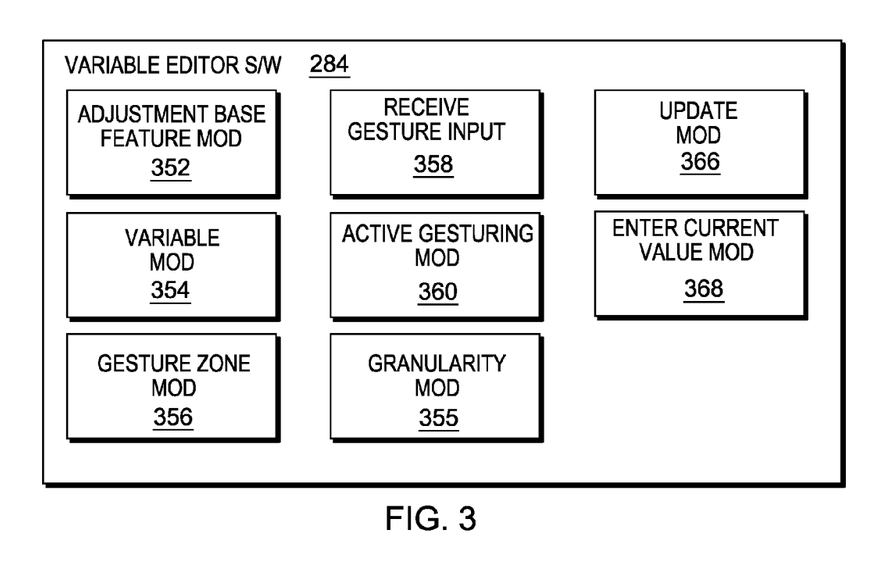
FIG. 3 is a schematic view of a variable editor software portion of the first embodiment computer system.

The present embodiment under discussion with reference to FIGS. 2 (flow chart) and 3 (software) is a one touch type, active area departure sub-type scheme where the editing session is terminated by removing the fingertip from all gesture zones for a period of at least one (1) second. This is what causes step S314 to proceed to step S316 in this particular embodiment.

When step S314 determines that the user is still touching the active region, processing proceeds to step S318, where receive gesture input module 358 determines if the gesture input location has shifted to another gesture zone. If the gesture input location remains in the same gesture zone, process 200 advances to step S320, where update module 366 adjusts the current value of the adjustment variable according the users latest gesture motion made within the gesture zone.

If the gesture input location has shifted gesture zones, process 200 advances to step S319, where: (i) enter current value module 368 enters the current value of the adjustment variable previously being edited into the editing field; and (ii) update mod 366 changes the current adjust variable and/or granularity of the current adjustment variable to correspond to the particular gesture zone into which the gesture has moved. After step S319, processing proceeds back to step S312 so that further developments in the gesture can be detected and responded to.

If step S318 determines that there has not been a change between two gesture zones, then processing proceeds to step S320 where update mod 366 adjusts the value of the current variable based on the movement within the current gesture zone detected at step S312. After step S320 is completed, processing returns to step S312, where gesture data module 356 receives new gesture input from the user as the user continues her gesture. Process 200 repeats steps S312, S314, S318, S319, and S320 until gesturing is complete.

Figure 4C:
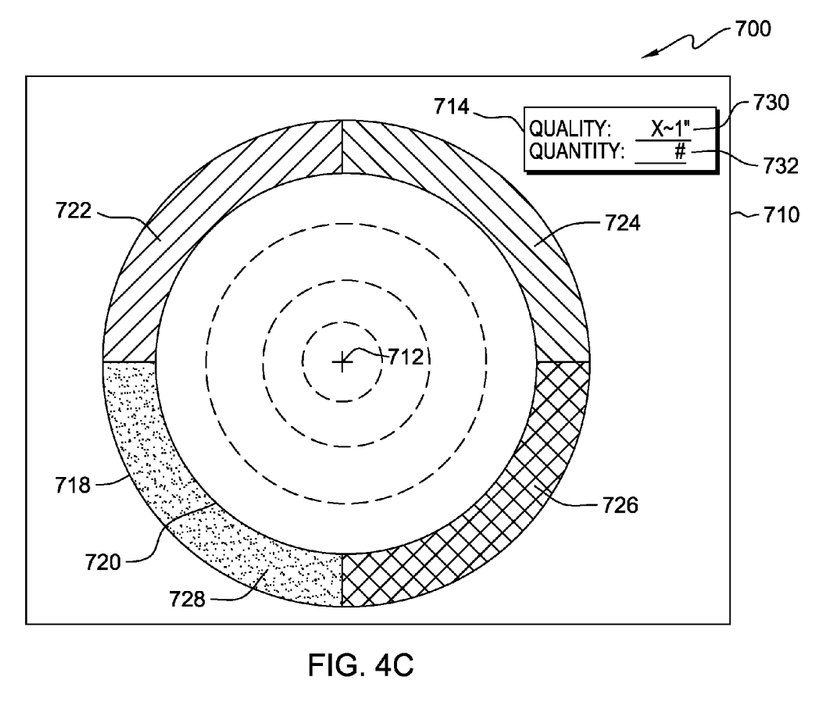
FIG. 4C is a third screenshot generated by the computer system according to the first embodiment computer system.

FIG. 4C is a third screenshot 700 generated by client computer system 104, the screenshot including: touch screen display 710; adjustment point 712; data entry fields 714; sequential-type adjustment variable gesture zone 718; numerical-type adjustment variable gesture zones 720; sequential-type value regions 722, 724, 726, and 728; quality field 730; and quantity field 732.

Third screenshot 700 presents a concentric circular UI according to an embodiment of the present invention. The gesture zones represent two types of adjustment variables. The dashed lines in gesture zones 720 indicate multiple gesture zones unseen in the display device. Each of the gesture zones 720 represents a change in adjustment granularity. Data entry fields 714 include: (i) quality field 730; and (ii) quantity field 732. The quality field is populated by a gesture in gesture zone 718. The quantity field is populated by a gesture in the gesture zones 720.

The quality field may be populated by one of four sequential values represented by value regions 722, 724, 726, and 728. One method of data entry using touch screen display 710 includes the following steps: (i) touch the screen with a finger at gesture zone 718; (ii) slide the finger over gesture zone 718 to the value represented in value region 726; (iii) slide the finger radially inward into gesture zones 720; (iv) quality field is populated with the value represented by value region 726; (v) a current value is presented in the quantity field to be modified by gesturing within the gesture zones 720; (vi) slide the finger in an angular and/or radial direction to adjust the current value; (vii) when the desired value is shown in the quantity field, remove the finger from the touch screen; and (viii) the quantity field is populated with the selected numeric value.

III. Further Comments and/or Embodiment(s)

One representative challenge for making user input by gestures performed by the user on a touchscreen device is adjustment of the height of a bar of a bar graph display. In order to change the values represented by any of the vertical bars, one could use direct manipulation of the graphical representation, such as dragging the vertical bars up or down. However, this is typically very imprecise, as the numerical resolution of the input gesture is equal to the display resolution of the device used. This resolution tends to be low, particularly for mobile devices. For these types of numerical input tasks, this disclosure presents a method that combines a natural input gesture on a small screen area with a variable numerical resolution.

For some applications, rotational input (a dragging gesture around a central point) is much more suitable as an input gesture when the range to be scrolled is large, because it affords potentially infinite resolution. Angular movement speed (the speed of rotation about a virtual center) is typically used to determine the amount of increment that should be done. For scrolling large lists of items this is sufficient as they contain at most a few thousand items.

For general numeric editing, the user may want to increment the number being edited at vastly different scales, ranging from 1 to 100000 or more. Relying only on angular speed to determine the amount of increment is infeasible in this case, because of physical limits to the movement speed and hardware limits to measurement frequency of the finger position. For specifically numerical input, this disclosure presents an improvement to a basic rotational input gesture with one that also provides for control of the increment scale.

Some embodiments of the present invention provide a method of inputting numerical data using multiple levels of scale simultaneously. Instead of dragging a slider that represents a numerical value up and down as is common in many current user interfaces, we propose to rotate a virtual knob around an axis, with the added caveat that the sensitivity of the knob is proportional to the distance between the drag location and the knob's virtual center. This allows a user to control the amount of increment (angle of knob rotation) and the speed of increment (distance between rotation center and current location of the pointer) simultaneously.

Technical advantages of this input method may include one or more of the following: (i) a user can directly and naturally control the amount of increment by moving her finger closer to the virtual center point of rotation while rotating, the closer to the center may correspond to a smaller increment; (ii) a higher dynamic range for input, meaning we can select a wider range of values, because the dynamic range depends on more than just angular speed, but mapping between distance and scale effectively covers multiple orders of magnitude; (iii) this gesture can either be used to select an index in a long list of items, or to edit a numerical value; and/or (iv) for adjustments to continuous numeric variables, the values can be rounded off to the granularity level of the gesture zone (for example, where the granularity level adjusts the thousands, a number may change from 3245 to 4000, rather than to 4345).

A set of variable adjustment gestures on a touchscreen display are performed by a set of steps to be discussed in the following paragraphs with reference to the following two examples: (i) display 800 of FIG. 5A; and (ii) display 850 of FIG. 5B.

Step (1): invoke edit mode on an existing user interface with a gesture. This invoking gesture may be application dependent. Examples of invocation gestures include tapping or pressing a number on screen. This step is not shown in the examples of FIG. 5A or FIG. 5B.

Step (2): choose a virtual center for rotation. In some embodiments, this center is a UI (user interface) element that shows the current value, or the item at the list index that is to be modified. In other embodiments, a virtual interface is displayed as a pop-up display, at a given screen location. When choosing a virtual center, it is generally advisable to ensure that there is sufficient space between the chosen center and the edges of the touch sensitive screen. This is shown by virtual center 802 of FIG. 5A and virtual center 852 of FIG. 5B.

Step (3): place a finger on the screen at a location relative to the virtual center. This is shown by: (i) finger position P1 of FIG. 5A; and (ii) finger position P3 of FIG. 5B.

Figures 5A, 5B:
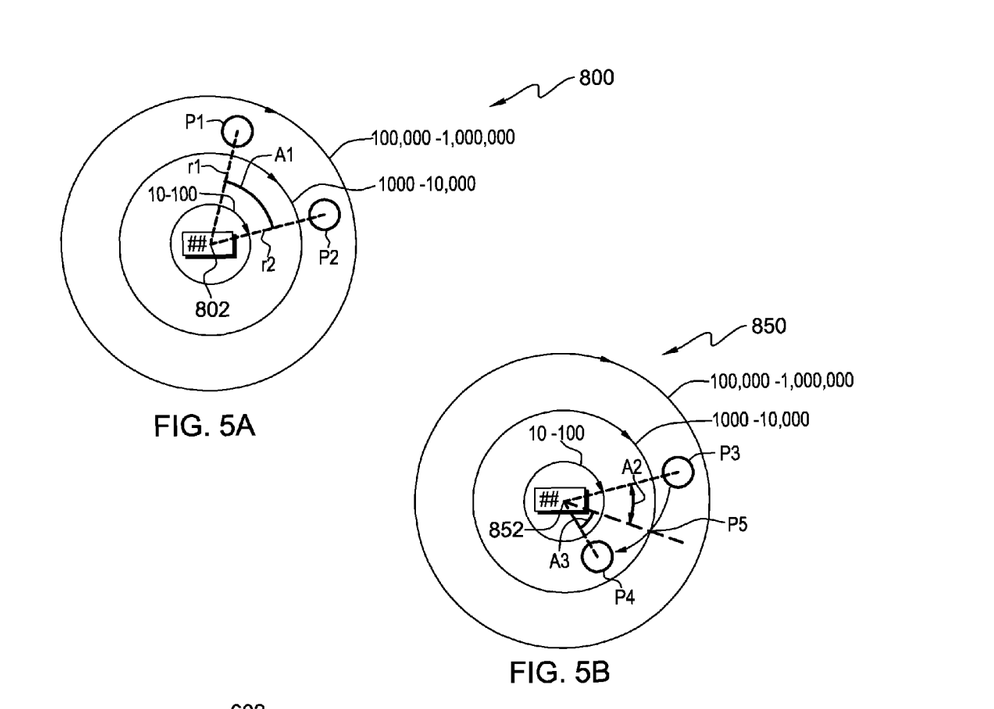
FIG. 5A is third screenshot, generated by the first embodiment computer system, depicting a change in pointer position according to an embodiment computer system.
FIG. 5B is a fourth screenshot, generated by the first computer system, depicting a change in pointer position according to an embodiment of the present invention.

Step (4): move the finger in a circular motion around the virtual center. In this embodiment: (i) clockwise motion increases the value or index; and (ii) counter clockwise motion decreases the value or index. In the example of FIG. 5A, the motion from finger position P1 to finger position P2 has only an angular component, specifically it is an angular component of a degrees. In the example of FIG. 5B, the motion from finger position P3 to P4 includes an angular component (of b degrees), but there is also a radial component in the finger motion of FIG. 5B.

Step (5): measure the current finger position for all of the following: (i) angular movement, (ii) changing of the gesture zone; and (iii) leaving the active area. In the example of FIG. 5A: (i) the angular movement of A1 degrees changes the adjustment variable by delta equal to 100,000*(A1*10/360) (rounded to the nearest 100,000); (ii) there is no changing of the gesture zone because r1 is substantially equal to r2; and (iii) the finger leaves the active region from its last position P2 thereby signaling the end of the adjustment. In the example of FIG. 5B: (i) the angular movement of A2+A3 degrees changes the value of the adjustment variable by delta equals 100,000*(A2*10/360) (rounded to the nearest 100,000) plus 1,000*(A3*10/360) (rounded to the nearest 1,000); (ii) the gesture zone changes at P5 as a result of radial direction motion of the finger; and (iii) the finger leaves the active region from its last position P4 thereby signaling the end of the adjustment.

In this embodiment, the granularities of the gesture zones are two orders of magnitude apart. For example, the outermost gesture zone in FIGS. 5A and 5B has a granularity of 100,000, with each full 360 degree rotation corresponding to a change of 1,000,000 in the adjustment variable. In a variation on the embodiments of FIGS. 5A and 5B, there may be a great multitude of (not separately marked) gesture zones. This would make it more difficult to express the adjustment variable delta as a simple equation (as done in the previous paragraphs), but may be preferable in some applications as leading to smoother, faster and/or more intuitive variable adjustment over large numeric ranges.

It is further noted that the examples of FIGS. 5A and 5B include the "one touch" feature discussed above in the previous sub-section of this DETAILED DESCRIPTION section because the user does not need to make any affirmative gestures to terminate editing mode such that adjustment of the variable(s) ends. Rather, in the examples of FIGS. 5A and 5B, the user merely removes her finger from the display and the editing mode ends automatically when it is sensed that there is no longer a finger anywhere in the active regions.

Figure 6:
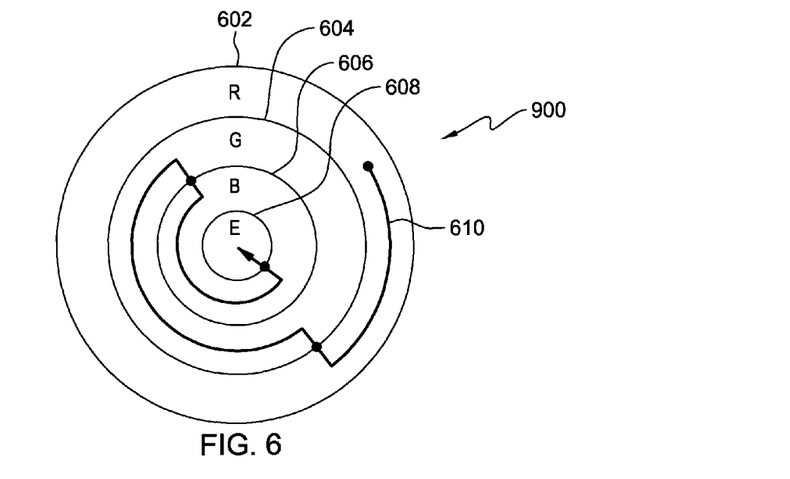
FIG. 6 is a fifth screenshot generated by the first embodiment computer system.

FIG. 6 shows display 900, for adjusting a color based on a scalar for each primary color, the display including: first circle 602; second circle 604; third circle 606; fourth circle 608; finger path 610; red gesture zone R; green gesture zone G; blue gesture zone B; and end region E. Notice how the finger path adjusts all three primary color scalars without once leaving the touchscreen. In this embodiment, when the finger is moved to end zone E, the user has the option to continue adjusting the colors so long as her finger remains on the end zone. In other words, in this embodiment, the end zone E is considered as part of the active region, even though finger motion within the end zone does not adjust any variable values. Alternatively, end zone E may be considered to be outside the active area such that moving into the end zone (or lingering in the end zone for longer than some threshold amount of time) will end edit mode. All of these alternatives exemplify the "one touch" feature of the present invention because, under any of these alternatives, when the finger leaves the active region then the editing session will end automatically and without affirmative action by the user to end the editing session.

In some embodiments of the present invention, the program maps the granularity to the distance of the interaction point from the rotational center, effectively offering an unlimited amount of granularity depending on the chosen mapping. This mapping can be a continuous function or a step function. Usually, the center point is fixed because of the UI layout (for example, the center point is a UI element displaying the current value). In other cases the center point might be dynamically computed based on the rotational gesture of the user.

While the increment multiples can be translated into zones, that is just one exemplary embodiment. Another embodiment could use no zones whatsoever, by continuously evaluating the distance to the center during a rotational gesture.

In some embodiments of the present invention, a completely analog implementation may be practiced such that a target number may be edited by a continuous function of distance of the pointer location from adjustment base feature location. In practice, the maximum number of granularity multiples is limited by the resolution and screen size. The target number will likely, in practice, be a step function of the distance of the pointer location from adjustment base feature location. There are some pragmatic limits to the number of zones created, which depend on: (i) finger size; (ii) screen size; and (iii) screen resolution.

For integer number editing the logical granularity progression would be powers of 10 (so 1, 10, 100 or 1, 100, 10000). For binary number editing the granularities would be powers of 2. For date-time editing the granularities would be 60:60: 24:{31/30/29/28}:12.

Some embodiments of the present invention detect accidental entry into adjacent gesture zones to resist changing granularity level or adjustment variable when the gesture unintentionally leaves one gesture zone and enters another. The logic for detecting accidental entry may include recognition of: (i) the angle of entry into the adjacent gesture zone, and/or (ii) the amount of travel in the adjacent gesture zone. When entry into the adjacent gesture zone is determined to be accidental, gesture input module 358 will determine that the gesture input location remains in the same gesture zone. This "snapping" between gesture zones will help users by making transition between gesture zones less sensitive, so touch gestures can be executed faster since less care or precision is required.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: non-exclusive or; for example, A and/or B means that: (i) A is true and B is false; or (ii) A is false and B is true; or (iii) A and B are both true.

User: includes, but is not necessarily limited to, the following: (i) a single individual human; (ii) an artificial intelligence entity with sufficient intelligence to act as a user; and/or (iii) a group of related users.

Adjustment base feature: a feature on a UI, such as a point or line, from which distance is measured to define gesture zones; for example, if gesture zones are in the form of concentric circular bands, then the adjustment base feature would be the common centerpoint of the concentric circles; the direction away from an adjustment base feature is herein called a "stacking direction"; a direction around and/or parallel to an adjustment base feature is herein called an "elongation direction."

What is claimed is:

1. A method of communicating information through a touch screen user interface device having a display, the method comprising:
    defining a plurality of gesture zones on the display;
    moving a first gesture contact continuously over a gesture segment;
    responsive to the gesture segment, populating a first data entry field and a second data entry field displayed on the display;
    wherein:
    the plurality of gesture zones includes a first gesture zone and a second gesture zone;
    each gesture zone of the plurality of gesture zones is shaped to define an elongation direction for that gesture zone;
    each gesture zone of the plurality of gesture zones represents a corresponding adjustment variable;
    the first and second gesture zones represent a corresponding first and second data entry field;
    the gesture zones of the plurality of gesture zones are stacked in a stacking direction;
    the stacking direction is at least generally normal to the elongation directions of the plurality of gesture zones;
    the gesture input includes: (i) first coordinate information for a first gesture input location within the first gesture zone with respect to a base feature location, and (ii) second coordinate information for a second gesture input location within the second gesture zone with respect to the base feature location, the first gesture input location and the second gesture input location making up the gesture segment within the first and second gesture zones;
    the first gesture zone is associated with data input into the first data entry field and the second gesture zone is associated with data input into the second data entry field; and
    at least the defining step is performed by computer software running on computer hardware.

2. The method of claim 1 further comprising the following steps:
    prior to the step of defining a plurality of gesture zones on the display, starting an editing session; and
    subsequent to the step of defining a plurality of gesture zones on the display, terminating the editing session responsive to a termination precondition based upon the gesture input;
    wherein:
    the termination precondition does not require the gesture input to disengage and then reengage the touchscreen.

3. The method of claim 2 wherein the termination precondition is that the gesture input leaves an active region.

4. The method of claim 3 wherein the active region is defined as an aggregate area of all gesture zones of the plurality of gesture zones.

5. The method of claim 2 wherein the first gesture zone is annular in shape so that the elongation direction of the first gesture zone is the circumferential direction of its annular shape.

6. A computer program product for communicating information through a touchscreen user interface device having a display, the product comprising software stored on a non-transitory software storage device, the software comprising:
first program instructions programmed to define a plurality of gesture zones on the display; and
second program instructions programmed to receive gesture input, through the display;
wherein:
the plurality of gesture zones includes a first gesture zone and a second gesture zone;
each gesture zone of the plurality of gesture zones is shaped to define an elongation direction for that gesture zone;
the first gesture zone represents a first adjustment variable having a first initial value;
the second gesture zone represents a second adjustment variable having a second initial value;
the first adjustment variable and the second adjustment variable are distinct;
the gesture zones of the plurality of gesture zones are stacked in a stacking direction;
the stacking direction is at least generally normal to the elongation directions of the gesture zones of the plurality of gesture zones;
the gesture input includes: (i) first coordinate information for a first gesture input location within the first gesture zone with respect to a base feature location, and (ii) second coordinate information for a second gesture input location within the second gesture zone with respect to the base feature location, the first gesture input location and the second gesture input location making up a continuous gesture segment within the first and second gesture zones; and
the first gesture zone is associated with data input into a first data entry field displayed on the display based on the first adjustment variable and the second gesture zone is associated with data input into a second data entry field displayed on the display based on the second adjustment variable.

7. The product of claim 6 wherein the software further comprises:
third program instructions programmed to start an editing session; and
fourth program instructions programmed to terminate the editing session responsive to a termination precondition based upon the gesture input;
wherein:
the termination precondition does not require the gesture input to disengage and then reengage the touchscreen.

8. The product of claim 7 wherein the termination precondition is that the gesture input leaves an active region.

9. The product of claim 8 wherein the active region is defined as an aggregate area of all gesture zones of the plurality of gesture zones.

10. The product of claim 7 wherein the first gesture zone is annular in shape so that the elongation direction of the first gesture zone is the circumferential direction of its annular shape.

11. A computer system comprising:
a processor hardware set;
a software storage device; and
a touchscreen user interface device having a display;
wherein:
the processor set is structured, located, connected and/or programmed to run software stored on the software storage device; and
the software comprises:
first program instructions programmed to define a plurality of gesture zones on the display; and
second program instructions programmed to receive gesture input, through the display;
wherein:
the plurality of gesture zones includes a first gesture zone and a second gesture zone;
each gesture zone of the plurality of gesture zones is shaped to define an elongation direction for that gesture zone;
the first gesture zone represents a first adjustment variable having a first initial value;
the second gesture zone represents a second adjustment variable having a second initial value;
the first adjustment variable and the second adjustment variable are distinct;
the gesture zones of the plurality of gesture zones are stacked in a stacking direction;
the stacking direction is at least generally normal to the elongation directions of the gesture zones of the plurality of gesture zones;
the gesture input includes: (i) first coordinate information for a first gesture input location within the first gesture zone with respect to a base feature location, and (ii) second coordinate information for a second gesture input location within the second gesture zone with respect to the base feature location, the first gesture input location and the second gesture input location making up a continuous gesture segment within the first and second gesture zones; and
the first gesture zone is associated with data input into a first data entry field displayed on the display based on the first adjustment variable and the second gesture zone is associated with data input into a second data entry field displayed on the display based on the second adjustment variable.

12. The system of claim 11 wherein the software further comprises:
third program instructions programmed to start an editing session; and
fourth program instructions programmed to terminate the editing session responsive to a termination precondition based upon the gesture input;
wherein:
the termination precondition does not require the gesture input to disengage and then reengage the touchscreen.

13. The system of claim 12 wherein the termination precondition is that the gesture input leaves an active region.

14. The system of claim 13 wherein the active region is defined as an aggregate area of all gesture zones of the plurality of gesture zones.

15. The system of claim 12 wherein the first gesture zone is annular in shape so that the elongation direction of the first gesture zone is the circumferential direction of its annular shape.

* * * * *